United States Patent [19]

Weinblatt

[11] Patent Number: 4,939,326
[45] Date of Patent: Jul. 3, 1990

[54] FLAT SWITCH INSERTABLE INTO A MAGAZINE AND USABLE AS PART OF A SURVEY TECHNIQUE FOR READERSHIP OF PUBLICATIONS

[76] Inventor: Lee S. Weinblatt, 797 Winthrop Rd., Teaneck, N.J. 07666

[21] Appl. No.: 287,531

[22] Filed: Dec. 19, 1988

Related U.S. Application Data

[60] Continuation of Ser. No. 114,684, Oct. 29, 1987, abandoned, which is a division of Ser. No. 923,330, Oct. 23, 1986, Pat. No. 4,726,771, which is a continuation-in-part of Ser. No. 827,757, Feb. 7, 1986, Pat. No. 4,659,314.

[51] Int. Cl.$^5$ ............................................. H01H 27/04
[52] U.S. Cl. .................................... 200/506; 200/505; 200/61.19
[58] Field of Search ............... 200/506, 505, 508, 512, 200/533, 61.08, 61.19, 554

[56] References Cited

U.S. PATENT DOCUMENTS

| 3,062,326 | 11/1962 | Jones et al. | 200/61.19 X |
| 3,111,655 | 11/1963 | Kotarsky et al. | 200/506 |
| 3,141,944 | 7/1964 | De Voe | 200/506 |
| 3,577,121 | 5/1971 | Wing et al. | 200/61.19 |
| 3,803,374 | 4/1974 | Delgendre et al. | 200/61.19 |

FOREIGN PATENT DOCUMENTS 49628 11/1940 Netherlands ................... 200/153 D Primary Examiner—Renee S. Luebke
Attorney, Agent, or Firm—Frishauf, Holtz, Goodman & Woodward

[57] ABSTRACT

A technique for supplying power from a battery to a transmitter included as part of an insert in a magazine which is used to monitor magazine readership. A switch in the insert is open when the magazine is closed to break the circuit to the transmitter. However, the switch is closed when the magazine is opened. Current is then supplied to the transmitter which emits an identification signal indicative of the magazine being read.

8 Claims, 3 Drawing Sheets

FLAT SWITCH INSERTABLE INTO A MAGAZINE AND USABLE AS PART OF A SURVEY TECHNIQUE FOR READERSHIP OF PUBLICATIONS

RELATED APPLICATIONS

This is a continuation of application Ser. No. 114,684 filed Oct. 29, 1987 abandoned which is a Divisional of Application Ser. No. 923,330 filed Oct. 23, 1986, now U.S. Pat. No. 4,726,771 which is a Continuation-in-part of Application No. 827,757 filed Feb. 7, 1986, now U.S. Pat. No. 4,659,314 issued Apr. 21, 1987.

BACKGROUND OF THE INVENTION

This invention is related to a technique for monitoring the exposure of selected publications to readers and, more particularly, to a flat switch used as part of an accurate, reliable electronic technique for determining when an individual who has been selected as a test subject has opened the publication so that he is likely to be reading it.

Various techniques are now in use to determine the readership of selected publications. Such publications are typically magazines. The term "magazine" is used herein to include any type of publication. Publishers and advertisers require this information in order to determine readership which, in turn, is useful to set printing runs, establish advertising rates, indicate geographic areas for concentrating resources, and provide an analysis of economic and social categories of the readership, and the like.

To currently obtain this information, such surveys are conducted primarily in one of two ways. Firstly, individuals are contacted personally or by phone and interviewed as to their magazine preferences. However, this method is inaccurate because it relies on memory recall of the individuals which has been shown as suspect and insufficiently accurate. Moreover, once the interviewer reveals the magazine in which he is interested, the selected individual being interviewed may develop a subjective inclination in favor of that magazine which ma not in fact be true.

The second approach involves collecting a number of volunteer or paid individuals who are expected to keep a diary of their reading habits. The diaries are then retrieved periodically from the individuals, and analyzed. However, this approach relies exclusively on the accurate and complete record keeping of the particular individuals involved. Unfortunately, this also tends to be unreliable because people occasionally forget to make entries, they may be distracted from doing it, or, occasionally, may simply not be inclined to make an entry. Therefore, the techniques conventionally used up to the present time suffer from serious disadvantages which have caused concern about the accuracy, and therefore the underlying value, of such surveys.

SUMMARY OF THE INVENTION

It is a primary object of the present invention to provide a switch usable as part of a technique for surveying magazine readership with improved accuracy.

Another object of the present invention is to provide a flat switch usable as part of a technique for surveying the readership of magazines without relying on the memory of the selected test subjects.

A further object of the present invention is to provide a flat switch usable as part of a technique for surveying the readership of selected magazines without pre-disposing the individual test subjects to a particular magazine.

Yet another object of the present invention is to provide a flat switch usable as part of a technique for surveying the readership of magazines electronically and without the need to conduct interviews or keep diaries.

Still another object of the present invention is to provide a flat switch usable as part of a technique for surveying the readership of magazines without the selected individuals being aware that a test involving magazines is in progress.

One other object of the present invention is to provide a flat switch which is low in cost yet operates reliably.

A still further object of the present invention is to provide a switch which is so flat that it can unobtrusively be inserted among the pages of a closed magazine.

These and other objects of the present invention are accomplished by a system for surveying the readership of a designated magazine by individuals selected as test subjects, comprising a transmitter unit suitably sized for unobtrusive attachment to a copy of the designated magazine and including a power source. A transmitter means is connected to the power source for emitting an identification signal which is unique to the designated magazine. A switch means is closed to supply power from the power source to the transmitter means when the magazine copy is opened. A receiver unit is adapted to be worn by each of the selected individuals and including detecting means for responding to the identification signal to generate a control signal, memory means for storing a signal representative of each detected occurrence of the control signal, and a power source connected to the detecting means and the memory means.

Another aspect of the invention is directed to a method for surveying the readership of a designated magazine by individuals selected as test subjects, comprising the steps of attaching a transmitter to each copy of the designating magazine, supplying electrical power to the transmitter in response to the magazine copy being opened, emitting from the transmitter an identification signal unique to the designated magazine, providing a receiver capable of distinguishing the identification signal from other signals to generate a control signal in response thereto, and storing in response to the control signal a signal representative of each occurrence of the control signal.

A further aspect of the invention is directed to a switch comprising a first member capable of assuming a flat shape and a second member capable of assuming a flat shape and having two opposite ends at least one of which is connected to the first member. The second member has a portion thereof movable between a first position wherein the first and second members are lying flat against each other and a second position wherein the second member is spaced from the first member. A pair of facing contacts is connected to the first member. A resilient means is connected to at least one of the first and second members to bring the pair of contacts into engagement with each other. An insulating means is connected to the portion of the second member for separating the pair of contacts from each other when the portion of the second member is in the first position and for permitting the pair of contacts to engage each other when the portion of the second member is in the second position.

Yet another aspect of the present invention is directed to a switch comprising a first member movable between a first position wherein it is flat and a second position wherein it is not flat. An elongated arm is connected at one end to the first member and movable between a first position assumed when the first member is in its first position and a second position assumed when the first member is in its second position. A first contact is mounted at a connection point to the first member, the connection point being at one distance from the juncture between the arm and the first member when the first member is in its first position, and at another distance when the first member is in its second position. A second contact is mounted on the arm at a first distance from the juncture between the first member and the one end of the arm, the first distance being different than the one distance and equal to the another distance.

Still another aspect of the present invention is directed to a switch comprising a thin, foldable rectangular support having a surface with two opposite sides and two opposite ends extending between the sides. A first conductor is mounted on the surface along one of the side edges at less than a first given distance and extending from one of the ends toward the other end of the support. A second conductor is mounted on the surface along the one side edge at more than the first given distance and extending from the other end of the support toward its one end. A third conductor is mounted on the surface along the other one of the edges at more than a second given distance and extending from the other end of the support toward its one end. A fourth conductor is mounted on the surface along the other one of the edges at less than the second given distance and extending from the one end toward its other end. A fifth conductor is mounted on the surface at a third given distance from the first conductor along the one end. A means is provided to connect the second and third conductors to each other. A means is provided to connect the fourth and fifth conductors to each other. A a sixth conductor is mounted on the surface at its other end and extending therealong for a distance greater than the third given distance. With the support being folded, the ends face each other with the sixth conductor spanning the gap between the first and fifth conductors. A flat insulating means is removably interposed between the sixth conductor and the first and fifth conductors.

DETAILED DESCRIPTION OF THE PREFERRED EMBODIMENT

To conduct the survey, persons are selected by the surveying organization based on certain criteria. These criteria can be, for example, age, income, geographic location, sex, and level of education. The publisher and/or advertisers of the magazine may require an analysis of their readership which is broken down into one or more of these categories. The individuals who are approached to be test subjects are merely asked to participate in a test the details of which are not explained. Each person is told only that a requirement of the test is the wearing of a certain article of clothing. Additional information is preferably not supplied in order to avoid pre-disposing or prejudicing the individual test subject toward or away from the aims of the survey. For example, if the individual were to be told that the survey relates to magazines, then this might result in more attention being paid to perusing magazines than would be normal for that person. Even worse would be the situation were the individual told the particular magazine involved in the survey. In order to avoid this problem, each individual is given an article of clothing to wear on a regular basis. For example, such an article of clothing might be a watch for men or a bracelet for women.

Figure 1:
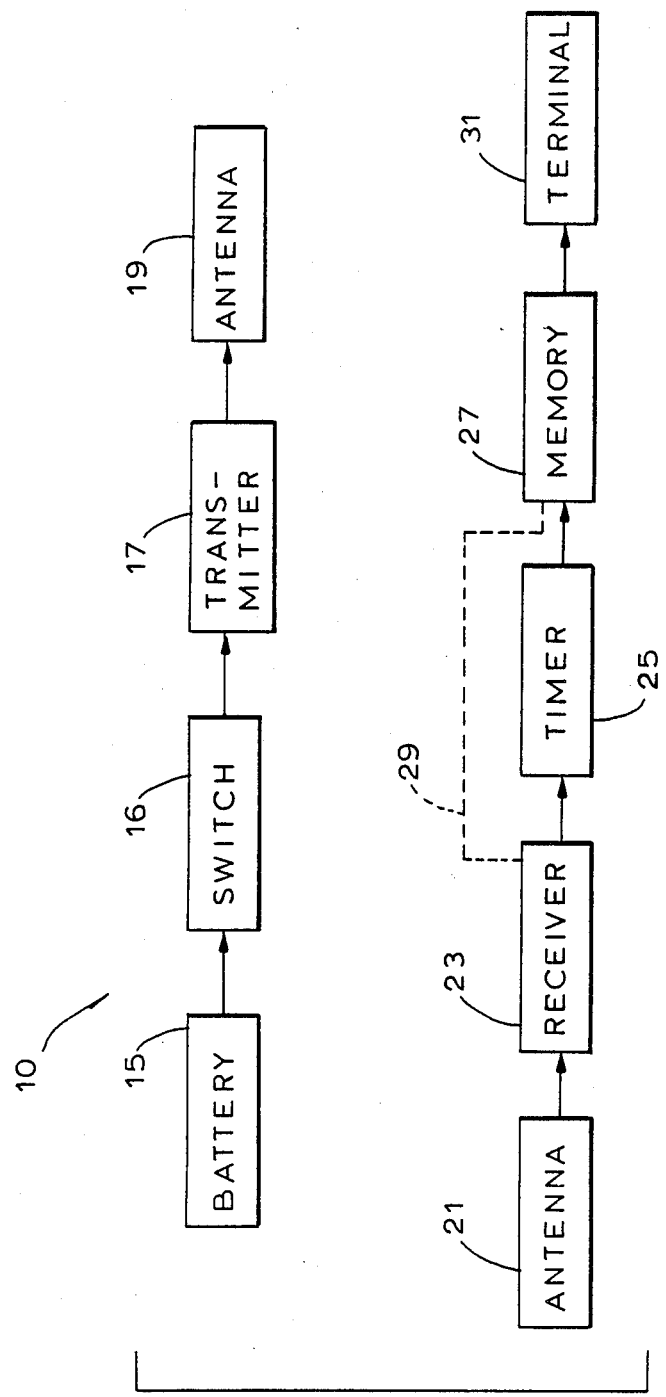
FIG. 1 is a schematic circuit block diagram of the invention.

As depicted in FIG. 1, a receiver unit 10 and a transmitter unit 20 cooperate to provide information relating to the readership of a designated magazine by individuals who are selected to be test subjects.

The transmitter unit 10 is preferably constructed in the form of a flat, ultra-thin, card-sized insert for the magazine. Various types of inserts are commonly placed in magazine copies to advertise such products as perfume or to provide a convenient mailing postcard for a particular purpose. Such a card is typically stapled into or adhesively secured to a page inside the magazine copy. In this manner, the transmitter unit is camouflaged so that it provides no indication to the reader of its true purpose. In fact, to enhance its camouflage it might be printed with some type of advertisement or provided with a perfume-saturated flap. Internally, the "card" includes a battery 15 which powers transmitter 17 when switch 16 is closed Battery 15 must, of course, be of the flat type with dimensions which, for example, are those of a battery currently available as part of a Polaroid film pack. The structure of switch 16 is discussed in detail below.

Transmitter 17 can emit an analog or digital magazine identification signal via antenna 19. This signal is unique to that particular magazine. Thus, Time Magazine is assigned a signal and Newsweek is assigned a different one. A transmitter 17 can be a microchip which is sized small enough and flat enough to be accommodated in the "card". In the preferred embodiment, transmitter 17 is digital and generates a particular digital code. Such transmitters are conventional and well known. Clothing tags in department stores currently contain such transmitter chips as part of an anti-theft system. As such, no further details of its circuitry and configuration is deemed necessary. Antenna 19 is a miniature wire which, however, is sufficiently effective to emit the desired signal for the necessary distance, as discussed below.

A receiver unit 20 is accommodated in the above-mentioned article of clothing, such as a watch or bracelet. It serves some useful or decorative function for its wearer so that the particular individual is unaware of its significance as far as the conduct of a survey is concerned. A watch is ideal for this purpose because a timing circuit is required anyway for the desired operation of the circuitry, as explained below.

Receiver unit 20 includes a receiving antenna 21 connected to a receiver 23. Receiver 23 is a circuit which serves to distinguish the signal emitted by transmitter 17 from other signals which may be picked up by antenna 21. If transmitter 17 is analog in nature, then receiver 23 would be a filter responsive to a very narrow range of frequencies. However, in the preferred digital embodiment, receiver 23 is a logic circuit which responds only to the particular digital code emitted by transmitter 17. Such circuitry is conventional and well known. As such, no specific circuit details are deemed necessary.

When receiver 23 detects a signal corresponding to that emitted by transmitter 17, it sends a control signal to timer 25. Timer 25 is, in turn, connected to memory 27. When receiver 23 initially detects the signal from transmitter 17 which identifies a particular magazine, its control signal causes timer 25 to store in an address location of memory 27 the exact time when the identification signal was first detected. When the identification signal is no longer picked up by receiver 23, timer 25 is controlled to store in the next address location of memory 27 the exact time when that signal loss occurred. Thus, by substracting the first time stored in the memory from the second time stored in the memory, a "reading period" is obtained. Each such reading period is representative not only of the exposure of the magazine to the reader but also of a "reading occurrence". An analysis can then be made of how many times the individual test subject picked up the magazine and, also, the length of time the magazine was read for each occurrence.

In an alternative embodiment, receiver 23 is connected directly to memory 27 via line 29 shown in broken lines. The control signal over line 29 from receiver 23 would be effective to store an occurrence signal in specially assigned address locations of memory 27. Thus, memory 27 would have one set of address locations dedicated to "occurrences" and another set of address locations dedicated to "reading periods".

The information content of a memory 27 is retrieved from it by terminal 31 It should be understood that terminal 31 is normally not coupled to memory 27 which is housed in the above-mentioned article of clothing. Terminal 31 is a remote unit which is coupled to the article of clothing by suitable plugs after it has been retrieved by the surveying organization from the individual test subject A suitable plug is inserted into the watch, say, and the stored information is caused to be transferred from memory 27 to terminal 31. Terminal 31 can be another form of memory, a hard copy unit such as a printer, and/or a video display device.

A feature of this invention is the low power with which the magazine identification signal is emitted by transmitter 17. The transmitted signal is to be detected by receiver 23 only when the magazine is within approximately one foot of the article of clothing containing receiver unit 20. This is accomplished by adjusting the relationship between the transmitter power and the receiver sensitivity. The transmitter power can, for example, be reduced so as to be effective with a conventional receiver only up to the mentioned distance. On the other hand, the sensitivity of receiver 23 can likewise be adjusted so that it is low enough in comparison with what is available with a particular transmitter to detect signals only within the above-mentioned distance. This aspect of circuit design is conventional and well known. Accordingly, no specific details of the circuitry are deemed necessary.

Various devices are currently available which are capable of performing the tasks assigned to receiver unit 20. For example, Seiko markets a microprocessor-driven timepiece which it calls the Datagraph 2001. It includes a 20 K RAM memory capable of storing scheduling information. This memory could readily be adapted to receive the "occurrence" and/or "reading period" information for exposure of the magazine to an individual test subject. In addition, this Seiko product comes with the Datagraph 2301 interface module capable of transmitting data between the Datagraph 2001 and a computer terminal. Seiko also markets a system including the UC 2000 wrist terminal with 2 K bytes of memory, a chronograph, a four line display, and a partitioned memory; a UC 2100 keyboard which can be coupled to the wrist terminal; and a UC 2200 controller with additional 4K byte of memory, a built-in thermal printer, a RAM with a monthly scheduler, and means to transmit between the various units of the system. Such a unit can readily be modified for this invention by attaching to it an antenna 21 of a suitable size and type, and a microchip which functions as receiver 23.

Switch 16 is connected between battery 15 and transmitter 17. When transmitter unit 10 is inserted into the magazine and rests flat while compressed between its pages, switch 16 is open so that power from battery 15 is not supplied to transmitter 17. This prevents unnecessary draining of battery 15. When the magazine is opened, switch 16 includes a component which reacts to the decrease or removal of the compressive force previously applied to it by the pages of the closed magazine. As a result of the magazine being opened, this sensing element acts to close switch 16 and, thereby, supply power from battery 15 to transmitter 17 so that the above-discussed identification signal is emitted therefrom. Details of various embodiments of switch 16 capable of performing the above-described functions are provided below with respect to FIGS. 2-5.

Figure 2:
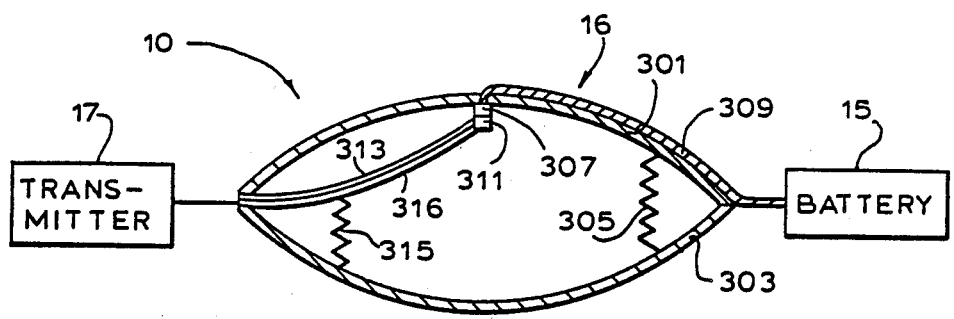
FIG. 2 is a cross section of one embodiment of the invention.

FIG. 2 shows upper and lower members 301 and 303 attached to each other at their ends. These are formed of a thin flexible, and insulating material such as paper or plastic. Spring 305, spreads apart members 301 and 303 unless counteracted by sufficient force to flatten these members against each other. Contact 307 is affixed to upper member 301. Conductor 309 connects battery 15 to contact 307. Conductor 309 runs along the outside of upper member 301 and penetrates it to touch contact 307 mounted on the inside of upper member 301. Contact 311 is mounted at the free end of arm 313. The other end of arm 313 is attached at a juncture of upper and lower members 301, 303. The length of arm 313 is selected such that when switch 16 is in its flattened condition with upper and lower members 301 and 303 lying against each other, contact 307 lies to the right of contact 311 and against member 303 However, when upper and lower members 301 and 303 assume the position depicted in FIG. 2, arm 313 when swung upward toward upper member 301 will bring contact 311 into engagement with contact 307. In order to do so, a spring 315 is connected between lower member 303 and arm 313. Arm 313 is constituted of an insulating material. A conductor 316 is attached to its underside and runs along its length to connect to contact 311.

When switch 16 is in its flattened condition as it is compressed between the pages of a closed magazine, upper and lower members 301 and 303 will be pressed against each other. In that position, contact 307 bears against lower member 303 and contact 311 bears against upper member 301 which is an insulator. Therefore, no power is delivered from battery 15 to transmitter 17.

However, when such compression is removed from switch 16, spring 305 will separate upper and lower members 301, 303 into the position depicted in FIG. 2. At the same time, spring 315 will swing arm 313 upward and bring contact 311 into engagement with contact 307. In this position switch 16 is closed and power from battery 15 is supplied to transmitter 17 via conductor 309, contact 307, contact 311, and conductor 316.

Various modifications of the embodiment depicted in FIG. 2 are also readily apparent. For example, arm 313 can be made of a resilient material to, thereby, eliminate the need for spring 315.

Figure 3:
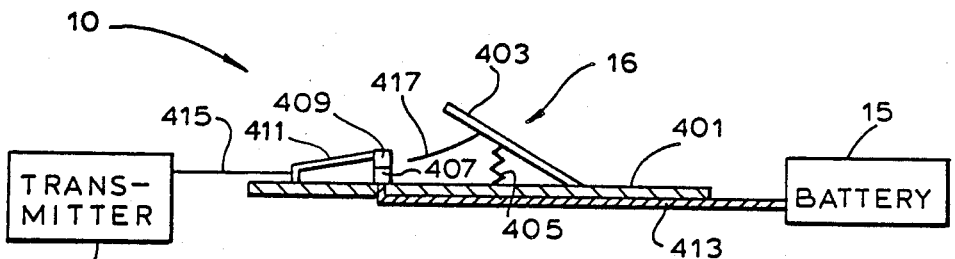
FIG. 3 is a cross section of another embodiment of the invention.

FIG. 3 depicts switch 16 as including a flat surface 401 to which is mounted a movable arm 403 affixed at one end to surface 401. The other end of arm 403 moves away from surface 401 as arm 403 swings upward. Spring 405 biases are 403 upward and away from surface 401. Contact 407 is mounted on surface 401 while contact 409 is connected to surface 401 by arm 411. Arm 411 is resilient and biases contact 409 toward contact 407. Contact 407 is connected to battery 14 by conductor 413 which runs along the opposite side of surface 401 from that on which the above-mentioned components are mounted. Conductor 413 also passes through a hole in surface 401 so that it can be connected to contact 407. Surface 401 is formed of an insulating material. Contact 409 is connected to transmitter 17 by conductor 415 and conductive arm 411. In order to separate contacts 407 and 409, a sheet 417 is provided which is connected at one end to arm 403. Its length is such that it can extend between contacts 407 and 409 when arm 403 is flattened against surface 401. However, when arm 403 is allowed to swing upward away from surface 401, sheet 417 will be withdrawn from between contacts 407 and 409 thereby allowing them to engage and connect battery 15 to transmitter 17.

Figure 4:
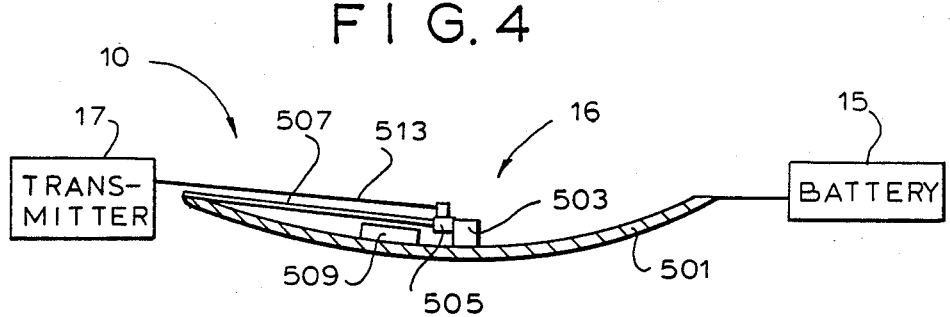
FIG. 4 is a cross section of yet another embodiment of the invention.

FIG. 4 shows a resilient member 501 which can be compressed to a flat shape but has a natural arcuate shape like that shown in FIG. 2. Mounted on member 501 is a contact 503. Contact 505 is carried on a free end of arm 507 having its other end attached to member 501. Member 501 is formed of a conductive material while arm 507 is an insulator. The length of arm 507 is such that when member 501 is in its flattened condition, contact 505 will rest on the upper surface of member 501 between contact 503 and the Connected end of arm 507. In that position, contact 505 will lie atop insulator 509 affixed to member 501. This is necessary because member 501 is formed of a conductive material. If a material other than a conductive one is used for member 501, insulator 509 can be eliminated. Contact 505 is connected to transmitter 17 by conductor 513 carried atop arm 507. The attached end of arm 507 insulates conductor 513 from member 501. With this arrangement, when transmitter unit 10 is compressed between the pages of a closed magazine, member 501 will be flat and, therefore, arm 507 is of insufficient length to put contact 505 into engagement with contact 503. Instead, contact 505 rests on insulated material 509 to keep switch 16 open. However, when the magazine is opened and member 501 is permitted to resume its normal arcuate shape, contact 505 will slide along insulator 509 until it abuts against contact 503 to close switch 16 and convey power from battery 15 to transmitter 17. Arm 507 can either be resilient to bias it toward member 501 or it can be connected firmly to member 501 at such an angle that the free end of the arm remains close to member 501 if a relatively, small arc is formed thereby.

If member 501 has at least its upper side formed of an electrically insulating material, pad 509 can be eliminated and arm 507 can be formed of a conductive material. However, a conductor would be needed to connect battery 15 to contact 503.

Figure 5:
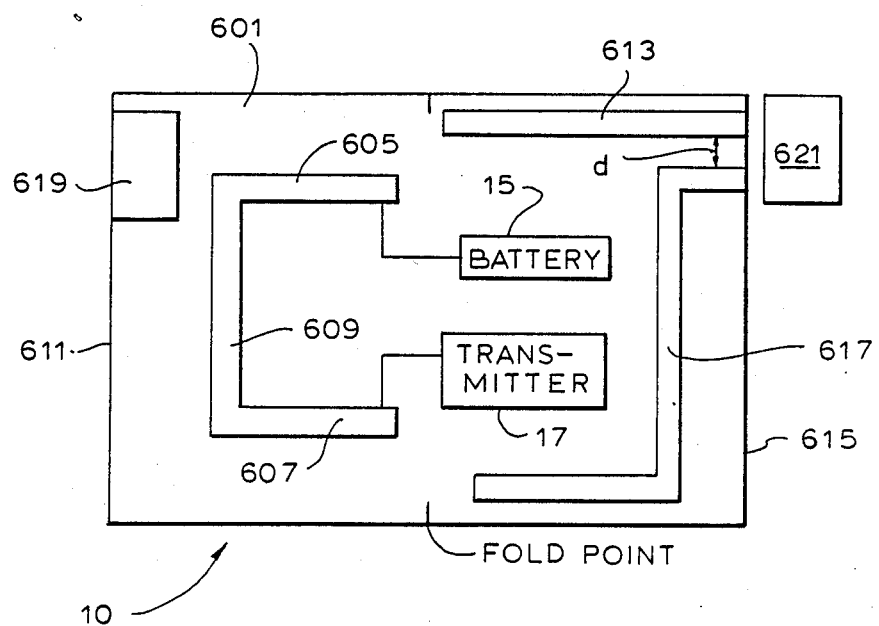
FIG. 5 is a plan view of a further embodiment of the invention.

The final embodiment of the invention is depicted in FIG. 5. It shows a thin, flat and rectangular sheet 601 formed of an insulating material such as paper. A number of flat conductors are carried on sheet 601. For example, these conductors can be formed of aluminum foil precisely cut and then pasted on. In the alternative, a metal layer can be deposited onto a sheet 601 by any well known deposition technique such as is, for example, used in integrated circuit fabrication. U-shaped conductor 603 has its legs 605 and 607 extending in the lengthwise direction of sheet 601. Legs 605 and 607 are connected by bridge 609 running in the widthwise direction of sheet 601 and spaced from the edge of end 611 of sheet 601. Conductor 613 is placed along a side edge of sheet 601 and extends from end 618 thereof. Conductor 617 runs along the opposite side edge of sheet 601 from conductor 613. The space between conductors 613 and 617 is larger than the space between legs 605 and 607 of conductor 603, for a purpose to be discussed below. Conductor 617 is extended toward conductor 613 at edge 615. However, conductors 613 and 617 remain separated at edge 615 by a distance d. Therefore, conductors 613 and 617 are not in contact with each other. Finally, conductor 619 is attached to end 611 of sheet 601 in opposed alignment with the gap d between conductors 613 and 617 at end 615 of sheet 601.

When sheet 601 is folded in half, all of U-shaped conductor 603 is accommodated within the space between conductors 613 and 617. Therefore, conductor 603 does not come into contact with any of the other conductors on sheet 601. However, conductor 619 engages both conductors 613 and 617 to bridge gap d therebetween. Therefore, conductor 619 places conductors 613 and 617 in electrical contact.

As also shown in FIG. 5, battery 17 has one terminal connected to conductor 613 and another terminal connected to conductor 603. Transmitter 17 has one of its power terminals connected to conductor 603 and its other power terminal connected to conductor 617. Therefore, when conductor 613 and 617 remain electrically separated, no power can be supplied to transmitter 17 from battery 15. However, when conductor 619 brings conductors 613 and 617 into electrical contact, current can flow from battery 15 to transmitter 17.

In order to keep conductor 619 from bridging the gap d between conductors 613 and 617, an insulating sheet 621 is positioned to lie between ends 611 and 615 of sheet 601 so as to separate conductor 619 from conductors 613 and 617. A portion of sheet 621 extends outward from sheet 601 in its folded position. This outwardly extending portion of sheet 621 is affixed to one page of the magazine while sheet 601 is affixed to its facing page. Thus, when the two pages are separated as the magazine is opened, sheet 621 will be pulled out from folded sheet 601 thereby permitting conductor 619 to engage conductors 613 and 617 in order to supply power from battery 15 to transmitter 17. A thin, resilient clip (not shown) can be used to bias ends 611 and 615 toward each other when 601 is folded to insure positive contact between conductor 619 and conductors 613, 617.

Various modifications to the FIG. 5 embodiment are readily apparent. For example, sheet 601 need not be rectangular in shape, nor do the conductors affixed to it need to be linear. Various shapes of sheet 601 can be used along with different arrangements of the conductors so long as the conductors do not come into contact when sheet 601 is folded and sheet 621 is in place.

Although a number of preferred embodiments have been described in detail above, various modifications are readily apparent. For example, the space defined between members 301, 303 in FIG. 2 can be fully enclosed and slightly pressurized. Springs 305 can, thus, be eliminated because the pressure will separate the members as the magazine is opened. Also, conductors in some embodiments have been shown as passing through holes in order to get from one side of a member to another. Instead, such a conductor can run along the same side of a member as its contact, but in a line transverse to any other conductive parts. This could readily be shown in a plan view of FIGS. 2-4. However, such a structure is clear and straightforward. Therefore, adding to the length of this specification by providing more figures for this purpose alone is not deemed necessary. Timer 25 can be dispensed with if for a particular type of survey the period of time during which the individual test subject is exposed to the magazine is not important. For such a survey, receiver 23 would be directly coupled to memory, 27 so that the latter only stores the number of occurrences and not the time period involved with each occurrence. Also, although receiver 23 has been disclosed as responsive to only one identification signal from transmitter 17, it can also be responsive to several such identification signals. Each identification signal would, of course, be indicative of a particular magazine. With such a configuration, the receiver 23 would provide a unique control signal for each different type of identification signal it detects. Each control signal would store information unique to that particular magazine in a location of memory 27. Thus, information would be organized in memory 27 so that it could be retrieved and interpreted in categories separated according to each magazine of interest.

These and other such modifications are intended to be a part of the present invention as defined by the scope of the following claims.

I claim:

1. A switch comprising:
    a first member having a substantially flat shape;
    a second member of a substantially flat shape and having two opposite ends at least one of which is connected to said first member and the other of which is movable between a first position relatively close to the first member and a second position spaced relatively further from said first member;
    a pair of facing contacts connected to said first member;
    resilient means coupled to said first member to bring said pair of contacts into engagement with each other; and
    insulating means connected to said second member for separating said pair of contacts from each other when said other end of the second member is in the first position and for permitting said pair of contacts to engage each other when said other end of the second member is in the second position.

2. The switch of claim 1, wherein said insulating means is a sheet having one end coupled to the other end of said second member and its other end interposable between said pair of contacts in the first position of the second member.

3. The switch of claim 1, further comprising biasing means coupled between said first and second members to bias said other end of the second member away from the first member.

4. The switch of claim 1, wherein said second member is resilient.

5. The switch of claim 1, wherein the other end of said second member is biased away from said first member.

6. The switch of claim 5, wherein said insulating means is a sheet having one end coupled to the other end of said second member and its other end interposable between said pair of contacts in the first position of the second member.

7. The switch of claim 5, further comprising biasing means coupled between said first and second members to bias said other end of the second member away from the first member.

8. The switch of claim 5, wherein said second member is resilient.

* * * * *